Dec. 2, 1952     H. ROMANO     2,620,221
VEHICLE WINDSHIELD AND DOOR CONSTRUCTION
Filed Aug. 5, 1950     2 SHEETS—SHEET 1
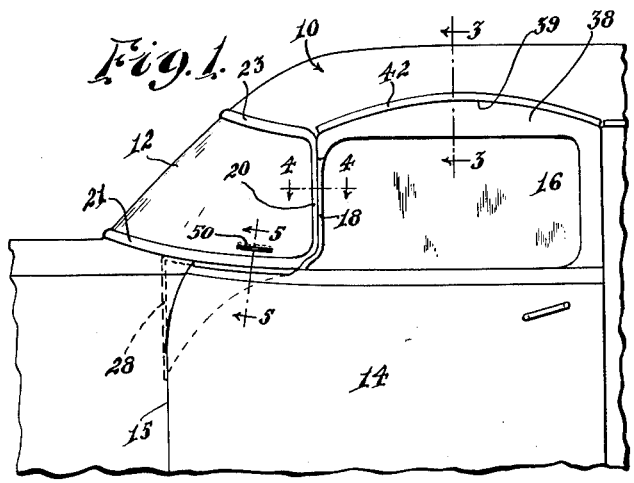
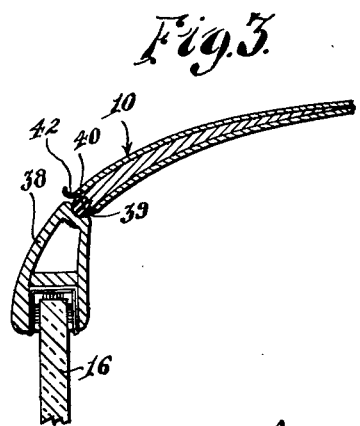
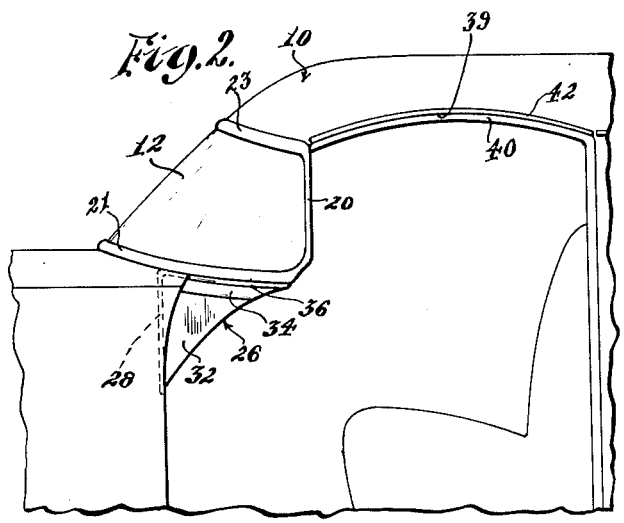
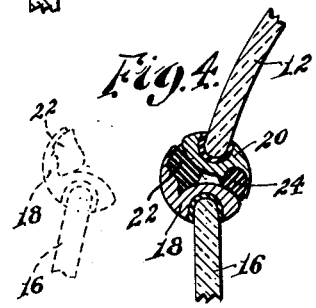
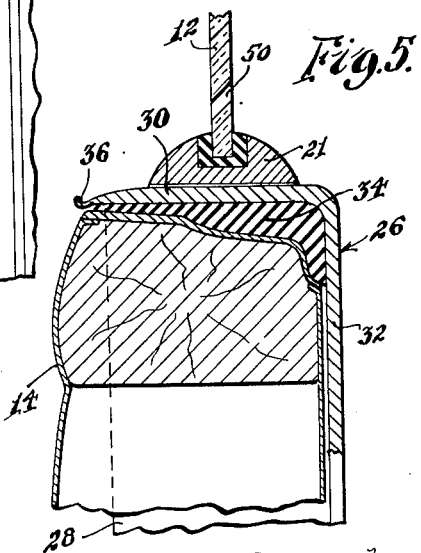
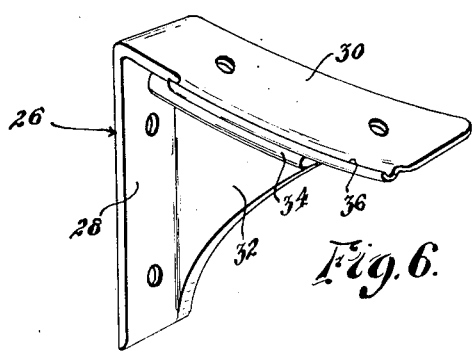
Inventor
Horace Romano
By his Atty,
John H. McKenna Dec. 2, 1952 H. ROMANO 2,620,221
VEHICLE WINDSHIELD AND DOOR CONSTRUCTION
Filed Aug. 5, 1950 2 SHEETS—SHEET 2
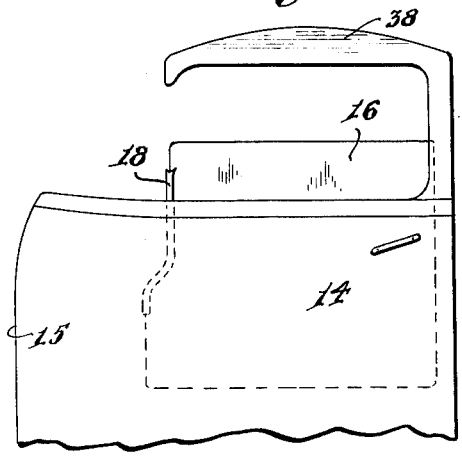
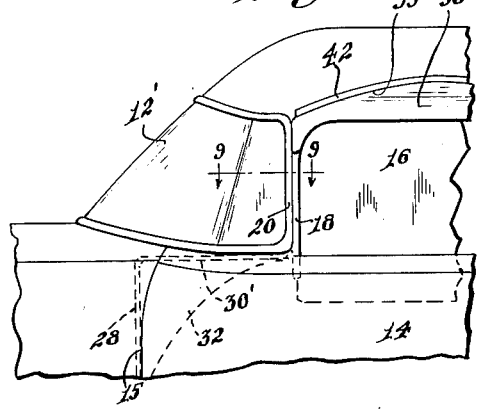
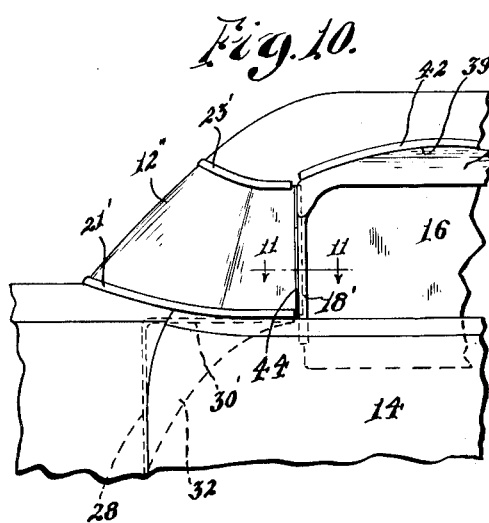
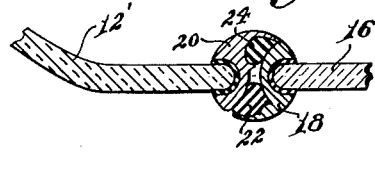
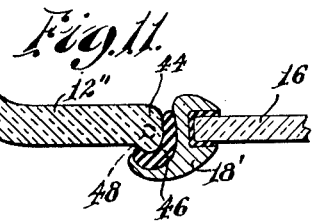
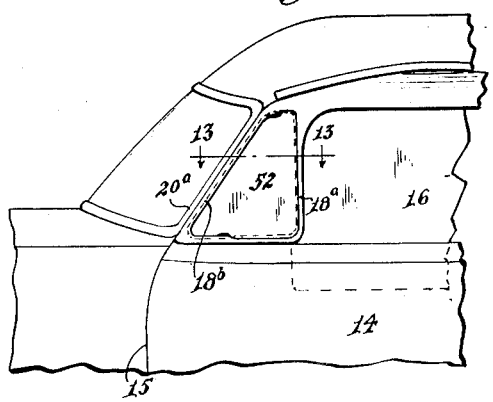
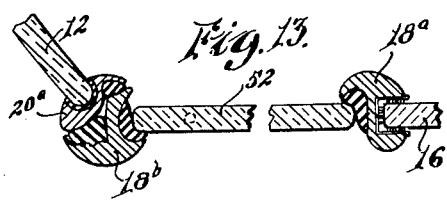
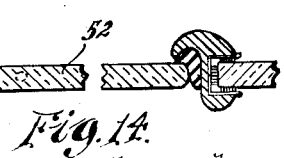
Inventor
Horace Romano
By his Atty
John H. McKenna Patented Dec. 2, 1952

2,620,221

UNITED STATES PATENT OFFICE 2,620,221

VEHICLE WINDSHIELD AND DOOR CONSTRUCTION

Horace Romano, Revere, Mass.

Application August 5, 1950, Serial No. 177,937

3 Claims. (Cl. 296—44)

This invention relates to improvements in transparent forward enclosing portions of vehicle bodies. More particularly it provides improvements in the windshield and forward door portions of automobile bodies, and the bodies of comparable vehicles, whereby obstructions of the forward and lateral view through the windshield and forward door windows may be substantially eliminated or reduced to an immaterial minimum.

Various proposals heretofore have been directed toward improving the vision through windshields of vehicles, especially at the forward corner regions of vehicle bodies where conventional body struts, forward door frame parts, and the like, constitute substantial obstructions in the way of desired full vision by the vehicle operator. However, so far as I am aware, none of these prior proposals has acceptably served the intended purpose. All of them have proven ineffective or impracticable for one reason or another.

It is an object of my present invention to provide windshield and forward door constructions for vehicle bodies wherein any glass supporting elements which extend across the forward and laterally forward vision of the vehicle operator are designed and positioned to have an immaterial amount of vision-obstructing effect. According to the invention all such vision-crossing glass-supporting elements have minimum cross-sectional dimensions and have their obstructing surfaces either generally circular in cross-section or have their broader surfaces disposed in, or generally parallel to, the plane of vision of the operator when looking past the glass-supporting element.

Another object of the invention is to provide windshield and forward door constructions for vehicles wherein the windshield may be extended a substantial distance around each forward corner of the vehicle body into the regions conventionally occupied by the upper forward window portions of the doors, with the rearwardly facing edges of the windshield and the forwardly facing edges of the glass in the door windows supported by cooperating elements on the respective edges which combine to produce relatively narrow vision obstructing composite elements having generally circular cross-section, or having their surfaces of maximum width dimension set in or generally parallel to the line of vision of the operator when looking past a said obstruction.

A further object of the invention is to provide windshield and forward door constructions for vehicle bodies wherein the forward vertical edge of the forward door window glass is seated in a channelled strip which is permanently secured to and movable with the glass for cooperating with a generally similar fixed strip in which the end edge of the windshield is permanently secured, whereby the door requires no window frame section along the forward edge of the glass other than the said strip which is secured to the window glass.

Yet another object of the invention is to provide windshield and forward door constructions for vehicles wherein the end edges of the windshield may be free of any supporting post or body strut and are reinforced and adapted to be directly engaged by cushioning means on the forward edges of the forward door window glass when the doors are closed.

It is, moreover, my purpose and object generally to improve the structure at the windshield and forward door regions of automobiles and the like, and more especially the cooperative relationship between the adjacent edge portions of the glass windshield and the glass in the forward door windows whereby clearer vision forwardly and forward-laterally is provided for the vehicle operator.

In the accompanying drawings:

Fig. 1 is a side elevation of forward portions of an automobile body embodying features of the invention;

Fig. 2 is a view similar to Fig. 1 but with the near forward door removed;

Fig. 3 is a fragmentary cross-sectional view on line 3—3 of Fig. 1, on a larger scale;

Fig. 4 is a cross-sectional view on line 4—4 of Fig. 1, on the scale of Fig. 3, and showing, by full lines, the manner of engagement between the forward door window strip and a complementary windshield strip, and showing, by dotted lines, the door window strip as it swings outward away from the windshield strip when the door opens;

Fig. 5 is a cross-sectional view on line 5—5 of Fig. 1 on a smaller scale than that of Figs. 3 and 4;

Fig. 6 is a perspective of one of the interior brackets which support the opposite end portions of the windshield;

Fig. 7 is a side elevation of the left-hand forward door of the vehicle of Figs. 1 and 2, with the door window partially lowered;

Fig. 8 is a view similar to Fig. 1 but showing a modified shape of windshield and supporting brackets;

Fig. 9 is a cross-sectional view on line 9—9 of Fig. 8, on a larger scale;

Fig. 10 is a view similar to Fig. 8 but showing another embodiment of the invention;

Fig. 11 is a cross-sectional view on line 11—11 of Fig. 10, on a larger scale;

Fig. 12 is a view generally similar to Figs. 1, 8 and 9 but showing still another embodiment of the invention;

Fig. 13 is a cross-sectional view on line 13—13 of Fig. 12, on a larger scale; and Fig. 14 is a cross-sectional view showing another shape of glass-framing composite element.

Referring to the drawings, an automobile body is indicated generally at 10, its windshield at 12, and the left-hand forward door of the vehicle at 14.

The upper portion of door 14 has a window frame within which a window glass 16 is vertically movable in any conventional manner. However, the frame portion at the forward edge of window glass 16 comprises a strip 18 which is separate from the remainder of the window frame and permanently secured to and movable with the glass. Strip 18 may be of any suitably rigid material, and may have cross-sectional shape as best seen in Fig. 4, for cooperating with a strip 20 of comparable cross-section which is secured along the rearwardly-facing edge of the windshield. The two strips 18, 20 are adapted to fit together when door 14 is closed, to provide a composite element having generally circular cross-section. Suitable cushioning strips 22, 24 are permanently secured respectively to the window glass strip 18 and the windshield strip 20 for cushioning shocks incident to coming together of these elements when the door 14 is swung to its closed position.

According to the invention, the opposite end portions of the windshield 12 have extent a substantial distance into the region conventionally occupied by the forward door windows, the illustrated door 14 being shown with the forward strip 18 of its window frame located a substantial distance rearward of the forward edge 15 of the lower portion of door 14. Hence, the windshield can extend a substantial distance around the forward corner of the vehicle body, as clearly shown in Figs. 1 and 2. Rigid support for each extended end portion of the windshield is provided by brackets, one of which is indicated generally at 26. It has one vertical leg 28 permanently secured to a rearwardly facing frame surface at the forward edge of the door opening, and has a generally horizontal slightly curved leg 30 extending rearward under the extended portion of the windshield with the latter secured to and rigidly supported by the bracket leg 30. A channelled strip 21 has the lower edge of the windshield glass permanently seated in its groove, and this strip 21 is secured to bracket 26 along the region of end extension of the windshield. Strip 21 may extend along the entire lower edge of the windshield, and a similar strip 23 extends along the upper edge of the windshield, both of these strips 21, 23 being represented as having integral connection to the strip 20 which extends along the rearwardly facing edge of the windshield.

Each bracket 26 has a reinforcing web 32 extending between its legs 28, 30, and a cushion strip 34 of rubber, or the like, is permanently secured at the outer side of each web in the corner of juncture of the web with leg 30, as best seen in Fig. 5. The cushion strip 34 on each bracket is adapted to absorb shocks when the lower portion of a door 14 swings shut against bracket 26.

Figs. 5 and 6 illustrate a preferred outer edge construction of the horizontal leg 30 of each bracket 26, this outer edge, which is exposed exteriorly of the vehicle body, being formed to provide a gutter 36.

As shown in Fig. 3, the top portion 38 of the window frame of door 14 preferably fits into a curved cutout 39 in the vehicle body, and the edge of the body along this cut-out is equipped with a cushioning strip 40 of rubber, or the like, against which the upper edge of the window frame portion 38 engages when the door 14 closes. A usual form of gutter 42 may extend along the edge of the cut-out, over the door opening.

It will be apparent from the foregoing description, in connection with the drawings, that the windshield 12 may extend a substantial distance around the forward corners of the vehicle body 10 with no obstructing elements forward of the composite cross-sectionally round element formed by the cooperating vertical window frame strip 18 and vertical windshield strip 20. Also, it will be obvious that the composite cross-sectionally round element at 18, 20 may be of size and shape to provide a minimum of obstruction to the forward-lateral view of the operator looking out past this composite element which, because of its cross-sectionally round shape, has equally small obstructing width regardless of the angle at which the operator looks past it. Yet, the windshield extensions and the forward door windows are effectively supported and protected. When the door window is lowered, as in Fig. 7, there is no door frame element at the forward edge of the window opening, and only the generally half-round windshield strip 20 extends downward at this region across the vision of the operator.

Figs. 8 and 9 illustrate a slightly different windshield shape, in which the end portions of the windshield 12' are in the same general plane as the door window 16. With this construction, each supporting bracket may have a straight horizontal leg 30' under the extended end portion of the windshield.

Figs. 10 and 11 illustrate a structure in which each end of the windshield 12" has a reinforcing rib 44 formed thereon, with no framing strip at the ribbed edges. In this embodiment, the door window strip 18' has a cushioning strip 46 of rubber, or the like, secured thereon for directly engaging the glass reinforcing rib 44 of the windshield. If desired, a reinforcing rod of any suitable material may be embedded in each rib 44, as indicated by the dotted circle at 48 in Fig. 11. Fig. 10 shows how the windshield may have relatively sharp right-angular corners at the extremities of the ribs 44, with the door window strip 18' extending straight down into the lower portion of the door 14. Also, in the Figs. 10 and 11 embodiment, the windshield strips 21' and 23', along the bottom and top edges of the windshield, terminate at the ribs 44.

In any or all of the embodiments of Figs. 1–11, a suitable slot may be provided through each end portion of the windshield, as shown at 50 in Figs. 1 and 5, for ventilation purposes. Means (not shown) may be provided at the inner side of the windshield for adjustably closing the slot 50. The slot and its closure means will be located so close to the lower edge of the windshield that they offer little or no obstruction to the operator's view.

When it may be desired to provide a conventional hinged type of ventilating window in the forward door 14 of the vehicle, this may be accomplished with the windshield and door construction as shown in Figs. 12 and 13 wherein the ventilating window 52 is mounted on the door 14, forwardly of the door window 16, but cooperating with frame strips which may be generally similar to the strips 18, 20 of the Figs. 1–7 embodiment, excepting that the window strip 18a in the Figs. 12, 13 form in a rigid part of the door in which the door window 16 slides, and another door strip 18b coacts with a windshield strip 20a to provide a cross-sectionally round element between the windshield and the forward edge of the ventilating window 52, which latter has bare edges for seating against cushioning strips on the door frame strips 18a, 18b, as best seen in Fig. 13.

While I presently consider the generally cross-sectionally round glass framing elements preferable, other cross-sectional shapes may be employed which will provide a minimum of obstruction to the view of an operator looking past them. Fig. 14 illustrates a relatively wide composite glass-framing element which provides a minimum of obstruction of view when arranged with its broader sides in the general plane of the line of vision of an operator when looking at or past the element from his position in the driver's seat.

It is intended that the patent shall cover, by suitable expression in the appended claims, whatever features of patentable novelty exist in the invention disclosed.

I claim as my invention:

1. In a vehicle body, a door hinged to a relatively fixed portion of the body at one side of the body, said door having a lower portion and an upper vertically movable window glass portion, means hingedly supporting said door at the forward edge of its said lower portion, a glass windshield extending across the front of the body and extending a substantial distance rearwardly above said lower portion of the door with its rearmost edge disposed substantially in a vertical plane, at a location substantially rearwardly of the axis of the hinge of said door, relatively fixed means on said body supporting said rearwardly extending portion of the windshield, said upper vertically movable window glass portion of said door being rearward of said rearmost edge of the windshield, and means respectively on said rearmost edge of the windshield and on a forward edge portion of said window glass adapted to interengage when said door is closed and said window glass is at least partially closed, the said means on the forward edge portion of said window glass being a relatively narrow reinforcing frame strip fixed on the said foremost edge of the window glass and movable therewith when the window glass is opened and closed.

2. In a closed vehicle body, a glass windshield, a forward door having an openable glass window therein, a generally vertical support on which the lower forward edge of the door is hinged, said door window having its forward edge located substantially rearward of said lower hinged forward edge of the door, and said windshield having substantial extent rearward beyond and above said lower hinged edge of the door, a bracket fixed on said support and having a rearwardly projecting portion rigidly supporting said rearward extension of the windshield, said door having integral frame portions extending along only the top and bottom and rear side of the window opening, a separate frame strip extending along the forward side edge of the window opening, said strip being fixed on the window glass and movable therewith, and directly engaging the rearmost edge of said rearwardly extending portion of the windshield when said door is closed and its window at least partially closed.

3. In a closed vehicle body, a glass windshield, a forward door having an openable glass window therein, a generally vertical support on which the lower forward edge of the door is hinged, said door window having its forward edge located substantially rearward of said lower hinged forward edge of the door, and said windshield having substantial extent rearward beyond and above said lower hinged edge of the door, a bracket fixed on said support and having a rearwardly projecting portion rigidly supporting said rearward extension of the windshield, said door having integral frame portions extending along only the top and bottom and rear side of the window opening, and the top portion of the frame having appreciable curved extent into the roof of the body above the door opening, a separate frame strip extending along the forward side edge of the window opening, said strip being fixed on the window glass and movable therewith, and directly engaging the rearmost edge of said rearwardly extending portion of the windshield when said door is closed and its window at least partially closed.

HORACE ROMANO.

REFERENCES CITED

The following references are of record in the file of this patent:

UNITED STATES PATENTS

| Number | Name | Date |
|---|---|---|
| 1,715,402 | Woodward | June 4, 1929 |
| 1,992,647 | Blair | Feb. 26, 1935 |
| 2,043,756 | Lalancette | June 9, 1936 |
| 2,157,366 | Vigroux | May 9, 1939 |
| 2,497,261 | Hicks | Feb. 14, 1950 |

FOREIGN PATENTS

| Number | Country | Date |
|---|---|---|
| 131,944 | Switzerland | June 1, 1929 |
| 458,291 | Great Britain | Dec. 16, 1936 |
| 476,239 | Great Britain | Dec. 6, 1937 |
| 657,664 | France | Jan. 16, 1929 |
| 869,822 | France | Nov. 27, 1941 |